(12) United States Patent
Murashima et al.

(10) Patent No.: US 6,192,186 B1
(45) Date of Patent: Feb. 20, 2001

(54) METHOD AND APPARATUS FOR PROVIDING/REPRODUCING MPEG DATA

(75) Inventors: Hirotsugu Murashima, Yamato Takada; Ohnaka Takashi, Moriguchi; Shigekazu Minechika, Kishiwada; Masahiko Tomikawa, Itami, all of (JP)

(73) Assignee: Sanyo Electric Co. LTD (JP)

( * ) Notice: Under 35 U.S.C. 154(b), the term of this patent shall be extended for 0 days.

(21) Appl. No.: 09/186,457

(22) Filed: Nov. 5, 1998

(30) Foreign Application Priority Data

Nov. 6, 1997 (JP) .................................................. 9-303858

(51) Int. Cl.⁷ .................................................. H04N 5/783
(52) U.S. Cl. .............................................. 386/68; 386/111
(58) Field of Search ................................. 386/46, 68, 111, 386/112, 124, 81, 82, 77; H04N 5/783

(56) References Cited

U.S. PATENT DOCUMENTS 5,742,728 * 4/1998 Yanagihara et al. .................... 386/68
6,047,101 * 4/2000 Kawamura et al. .................... 386/68

* cited by examiner

*Primary Examiner*—Huy Nguyen
(74) *Attorney, Agent, or Firm*—Michaelson & Wallace; Peter L. Michaelson

(57) ABSTRACT

Apparatus for providing MPEG data through which any MPEG decoder, without containing special functionality, can decode and display a slow motion picture. Specifically, to do so, the apparatus when, operating in a normal play mode, provides picture data included in original MPEG data, but when operating in a slow motion mode, provides not only the picture data, included in the original MPEG data, but also dummy data for repeatedly displaying the picture data several times in accordance with a slow motion speed.

7 Claims, 8 Drawing Sheets

FIG. 2 a) Display Sequence

| I0 | B0 | B1 | P0 | B2 | B3 | P1 | B4 |
|----|----|----|----|----|----|----|----|
| 1  | 2  | 3  | 4  | 5  | 6  | 7  | 8  | b)

| I0 | | | B0 | | | B1 | | | P0 |
|----|--|--|----|--|--|----|--|--|----| c) Display Sequence

| I0 | I0 | I0 | B0 | B0 | B0 | B1 | B1 | B1 | P0 | P0 | P0 |
|----|----|----|----|----|----|----|----|----|----|----|----|
| 1  | 2  | 3  | 4  | 5  | 6  | 7  | 8  | 9  | 10 | 11 | 12 | d) Display Sequence

| I0 | Ba | Ba | B0 | B0 | B0 | B1 | B1 | B1 | P0 | Bb | Bb |
|----|----|----|----|----|----|----|----|----|----|----|----|
| 1  | 2  | 3  | 4  | 5  | 6  | 7  | 8  | 9  | 10 | 11 | 12 | e) Display Sequence

| I0 | P0 | Ba | Ba | B0 | B0 | B0 | B1 | B1 | B1 | P1 | Bb |
|----|----|----|----|----|----|----|----|----|----|----|----|
| 1  | 2  | 3  | 4  | 5  | 6  | 7  | 8  | 9  | 10 | 11 | 12 |

METHOD AND APPARATUS FOR PROVIDING/REPRODUCING MPEG DATA

BACKGROUND OF THE INVENTION

The present invention relates to an apparatus for reproducing or providing MPEG data.

PRIOR ART

In these years, a Digital VCR, in which a video signal is recorded and reproduced as a digital data, has been developing. The digital VCR may record a video signal, such as, from television broadcasting, encoded to MPEG format which is an International standard for a method of compressing pictures. As to a recording media, not only a tape media but also a disk media are used for a recording and reproducing apparatus. It is noted that the present invention is applicable to both type of recording media, such as, disk or tape media.

MPEG method adapted a motion compensate prediction technology, a DCT (discrete cosine transform) technology and an entropy coding method. There are three types of frame picture in MPEG method, such as, I picture, P picture and B picture, which are categorized on different prediction method in time as shown in FIG. 4. I picture is an intra-coded picture and a complete one flame picture can be re-constructed only from I picture data. P picture is an inter frame predictive coded picture which is predicted from P or I picture located previously in time. B picture is also an inter frame predictive corded picture predicted from I or P picture placed previously or postly in time. Accordingly, a picture corresponding to P or B picture can not be re-constructed from only P or B picture data; other frame data for the prediction is also necessary for re-construction of that picture.

Further, the amount of data for each picture is not a fixed value, then there is no fixed relation between the location on the tape and the location on each picture. In the case of pictures having a frame rate of 30 frame per second, the data of 30 frame per second on average is necessary for collective I, P and B picture.

In the following description, it is the case that the MPEG data having 30 frame per second is recorded into a digital VCR (hereinafter, DVCR) in accordance with the standard of digital VCR association.

First of all, DVCR format will be described briefly.

FIG. 5 is a schematic diagram of recording format on a magnetic tape in accordance with the standard.

The amount of data recorded per second is corresponding to the data amount of 300 tracks. Each track has an ITI (Insert and Track Information) area, an Audio area, a Video area and sub-code area recorded in this turn.

FIG. 6 is a schematic diagram of the format in the Video area.

Data of the Video area comprises a block including 77 bytes×138 bytes which include 135 bytes for picture data and 3 bytes for auxiliary data (VAUX). An ECC2 Parity (11 bytes) is first added in the direction of 138 byte, then an ECCI parity (8 bytes) is added in the direction of 77 bytes. The data of 149 sync blocks is recorded on the media.

Audio(Sound), Video(Picture) and other data is respectively recorded as a unit of sync block. The sync block, as shown in FIG. 7, consists of a sync area (2 bytes), an ID area (3 bytes), a data area (77 bytes) and a parity area (8 bytes) and contains 90 bytes in total.

MPEG data, however, is recorded only into the Video data area of DVCR format. There are 135 sync block areas in the Video data area. As shown in FIG. 8, the Video data area contains a data area for normal play (NP data area), a data area for special play(TP data area) and, for option, a data area for error correction of MPEG signal recording (ECC3 area). Further, the TP data area contains a TPH data area and a TPL data area in accordance with the tape speed of special play.

A method of slow motion play will be described. In normal play mode, as shown in FIG. 3(a), a magnetic head runs along recorded track on the magnetic tape. If the speed of the tape is slower than normal, the magnetic head runs with some angle with recorded tracks as shown in FIG. 3 (b). Accordingly, one scan of head can not reproduce all the data from one track completely.

It, however, is well known that, if a head width and a tape speed are defined appropriately in accordance with a track width, all of data in one track can be reproduced as a result of several times of scan. This data reproduced from several scans of one track is stored in a memory and combined then all data of one track can be reproduced.

For example, if tape speed is set at one-third of normal play, three scans of head may reproduce all the data of one track. Therefore, all of data is reproduced at one-third of normal play for tape speed.

As described above, for example, the tape speed is set at one-third of normal play, all of recorded MPEG data can be reproduced at one-third tape speed of normal play.

In the case of MPEG data, if tape speed is set at one-third of normal play and MPEG data is reproduced, usual MPEG decoder in digital broadcasting receiver may not decode the data and reproduce pictures from provided MPEG data. The reason of this is as follows.

In MPEG video data, the frame frequency of picture is fixed. Namely, if an original picture has 30 frames per second, MPEG data for one second also includes data of 30 frames. Further, each frame includes a relative time data (PTS: presentation time stamp) which designate the time when the frame is to be displayed. Then, if original data is simply provided to MPEG decoder at one-third of original speed, MPEG decoder can not reproduce pictures since the provided data having only 10 frames per second even though the original frame frequency being 30 Hz and there is also some contradiction in PTS.

Considering above, it is necessary for reproducing slow motion pictures that MPEG decoder has a special function for displaying MPEG data even if the MPEG data contains such contradictions described above.

SUMMARY OF THE INVENTION

The object of this invention is to provide an apparatus for reproducing MPEG data which apparatus makes it possible that any MPEG decoder without such special function can decode and display slow-motion picture without any contradiction.

In accordance with this and other objects, the present invention, an apparatus for reproducing MPEG data, is characterized for comprising means for providing picture data including original MPEG data without any modification at a normal speed play and means for providing picture data including original MPEG data and dummy picture data for repeatedly displaying the original picture data for several times in accordance with slow motion speed.

The dummy picture data for repeating original I picture and the dummy picture data for repeating original P picture is forward predictive B picture with zero differential data which means a motion vector value from a past reference picture is zero. The dummy picture data for repeating B picture is the original B picture itself.

The numbers of dummy picture data is so selected that sum of displayed picture numbers per second of original MPEG data and displayed numbers per second of the dummy picture data at the slow motion picture mode is equal to the displayed picture numbers per second of original MPEG data at the normal play mode.

BRIEF DESCRIPTION OF THE DRAWINGS

FIG. 2 depicts a schematic diagram for describing a picture to be displayed at slow motion mode and video signal to be provided from the reproducing apparatus.

DETAILED DESCRIPTION OF THE PREFERRED EMBODIMENTS

The embodiment of this invention is described with reference to FIG. 1 and FIG. 2.

Figure 1:
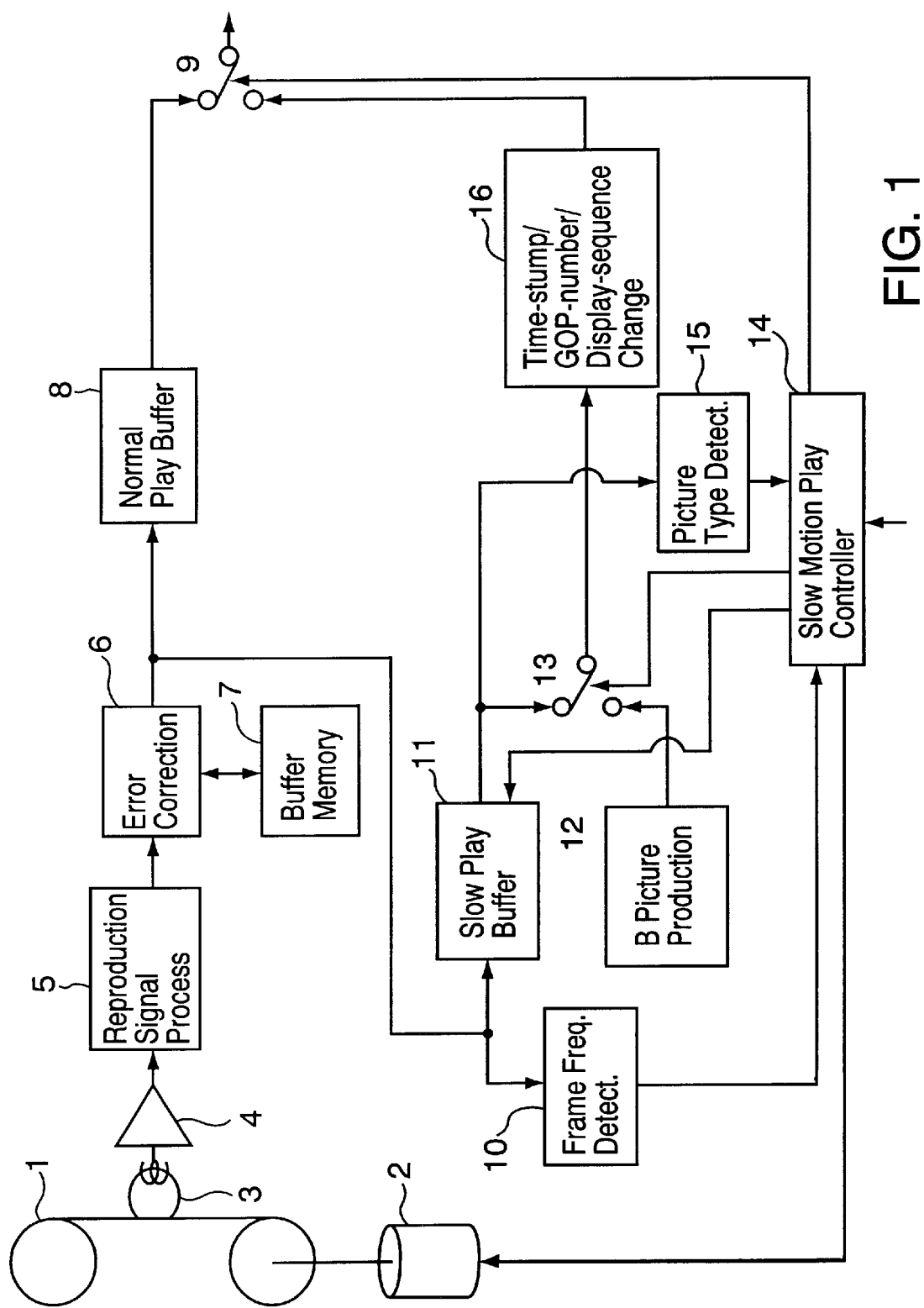
FIG. 1 depicts a block diagram showing a part of MPEG data reproducing apparatus which is a preferred embodiment in accordance with this invention.
Figure 3:
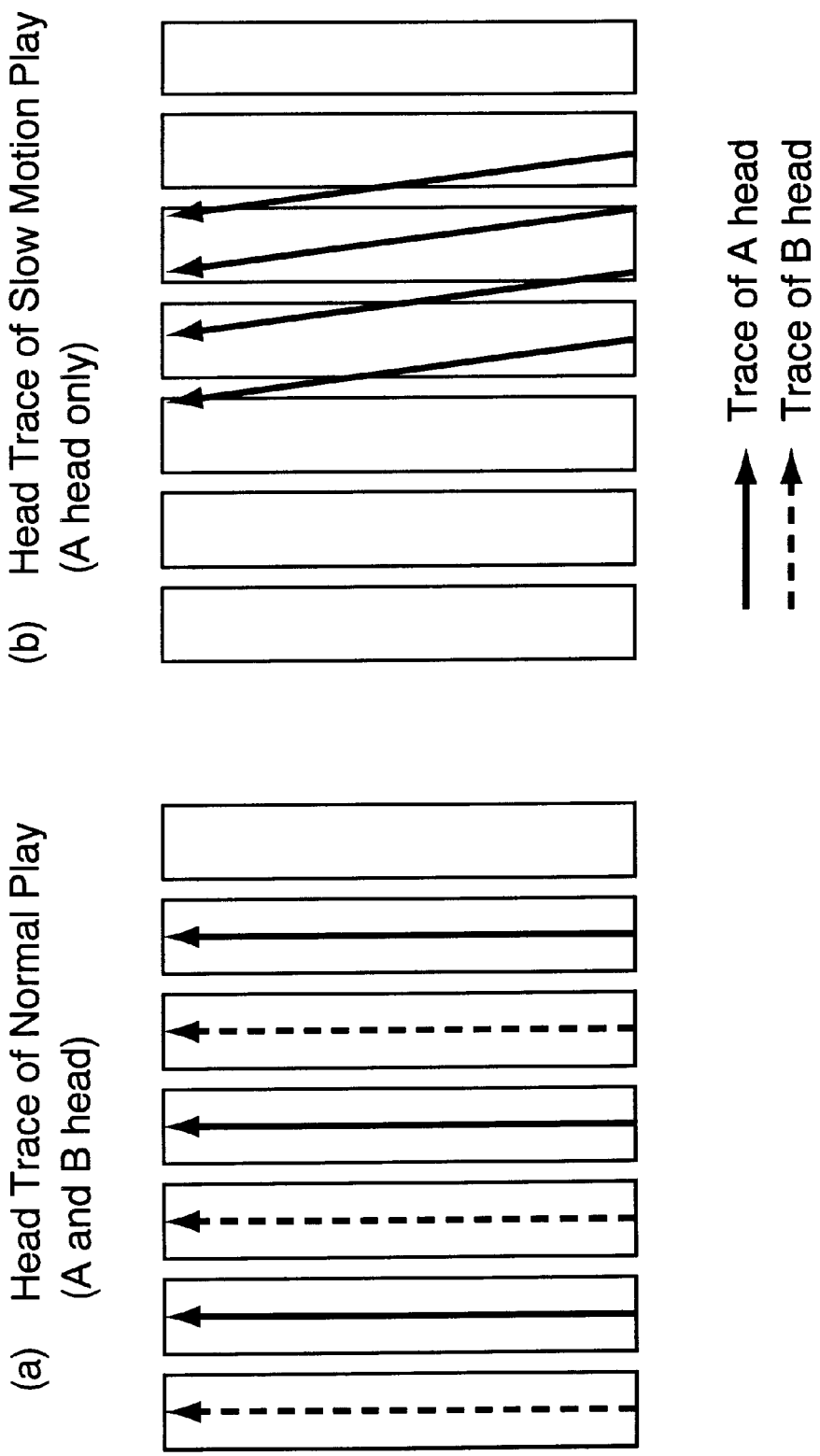
FIG. 3 depicts a schematic diagram showing head scans at normal play mode and slow motion play mode.
Figure 4:
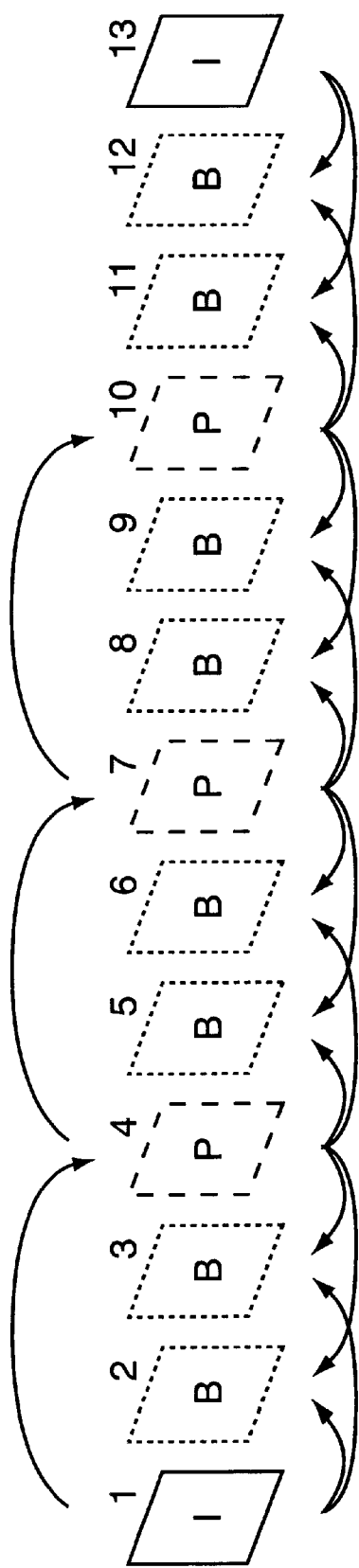
FIG. 4 depicts a schematic diagram showing picture types and its sequence among GOP.
Figure 5:
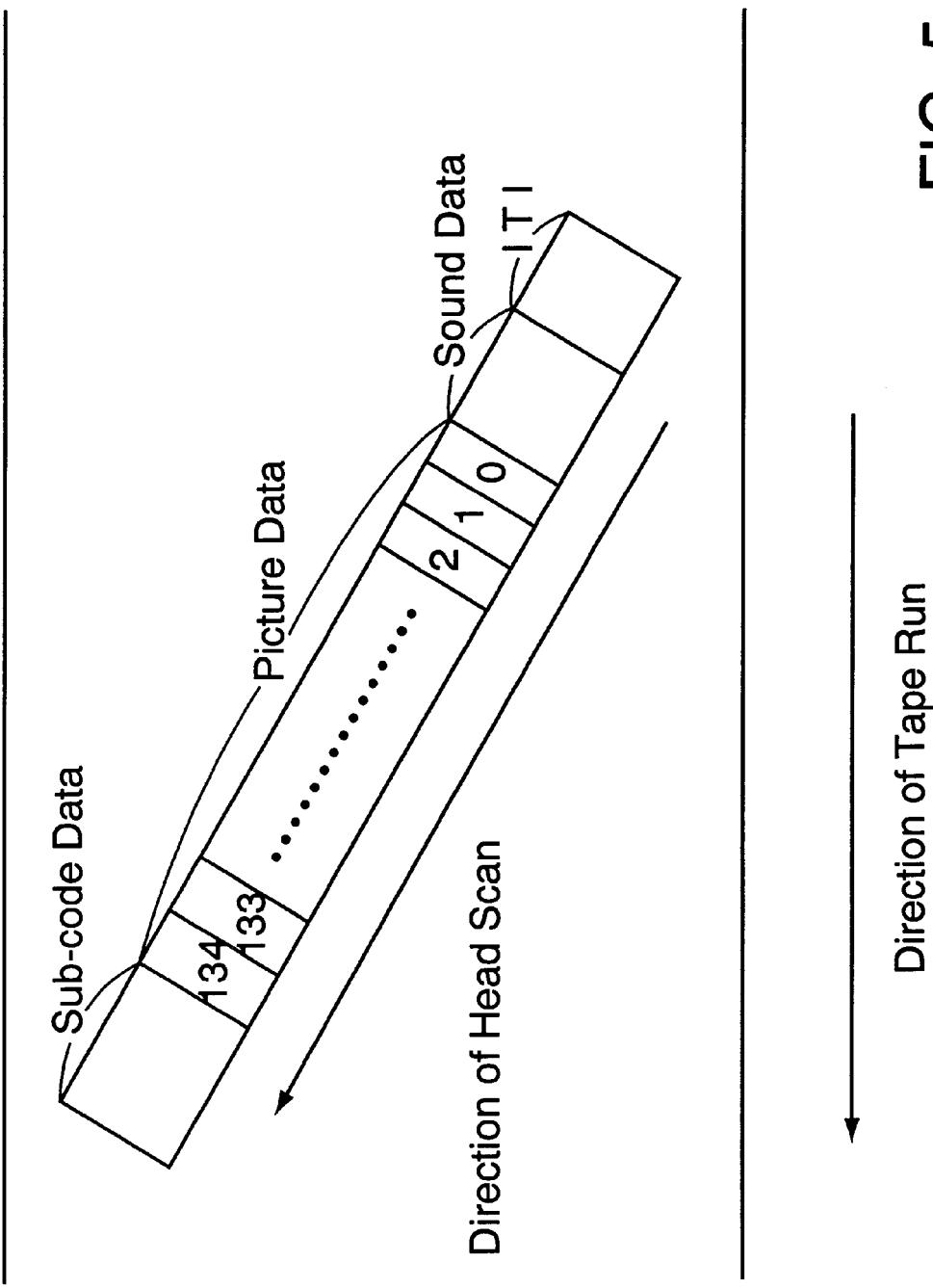
FIG. 5 depicts a schematic diagram showing a recording format on the magnetic tape.
Figure 6:
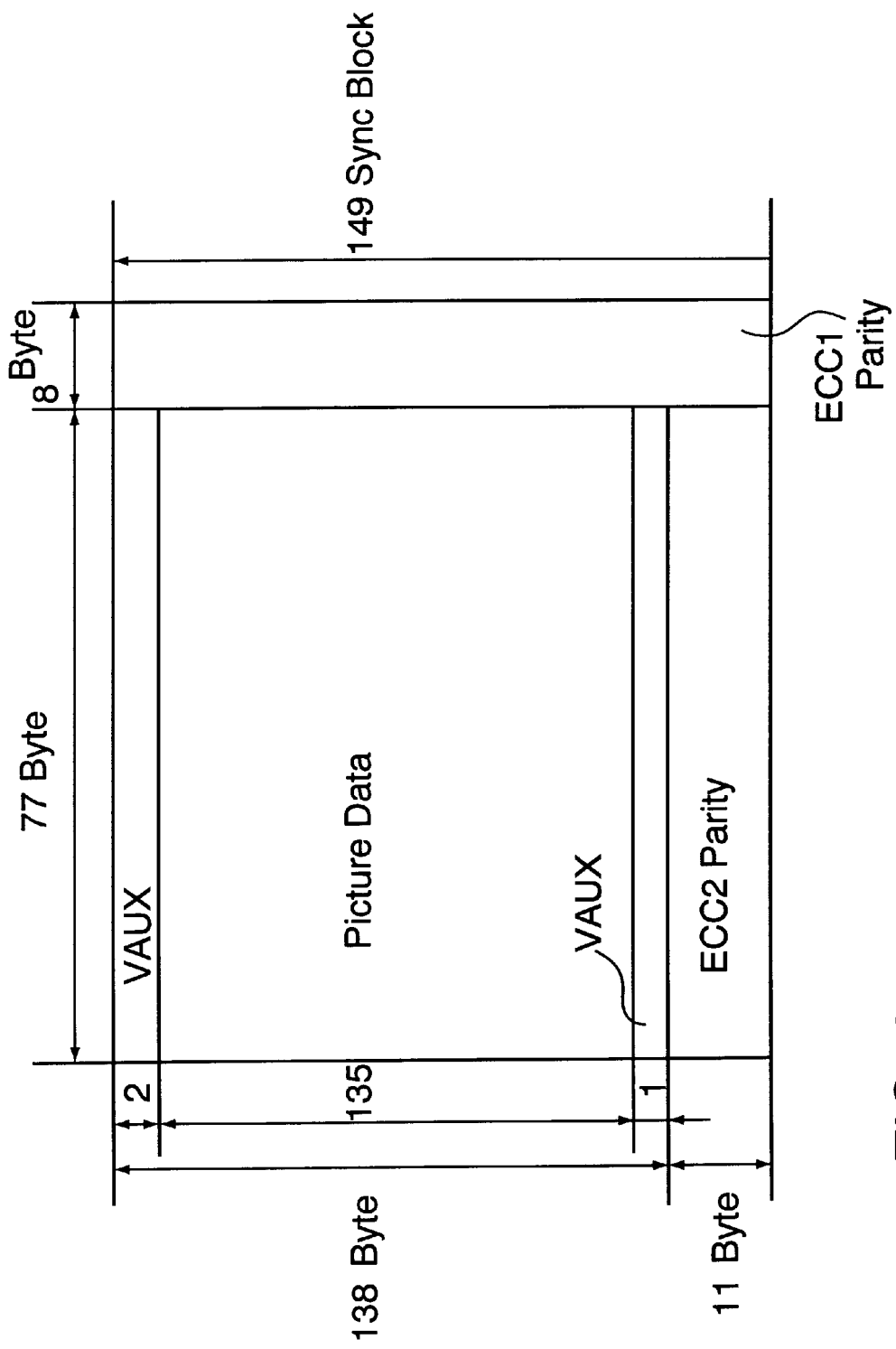
FIG. 6 depicts a schematic diagram showing a format of video area.
Figure 7:
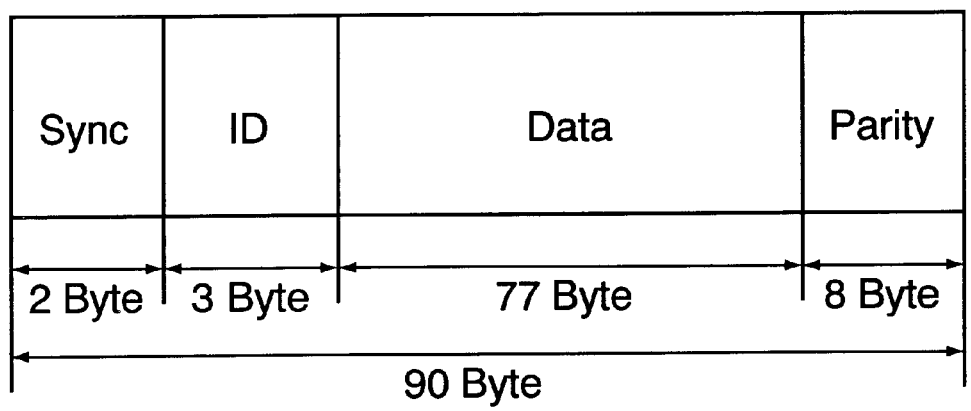
FIG. 7 depicts a schematic diagram showing a structure of sync-block.
Figure 8:
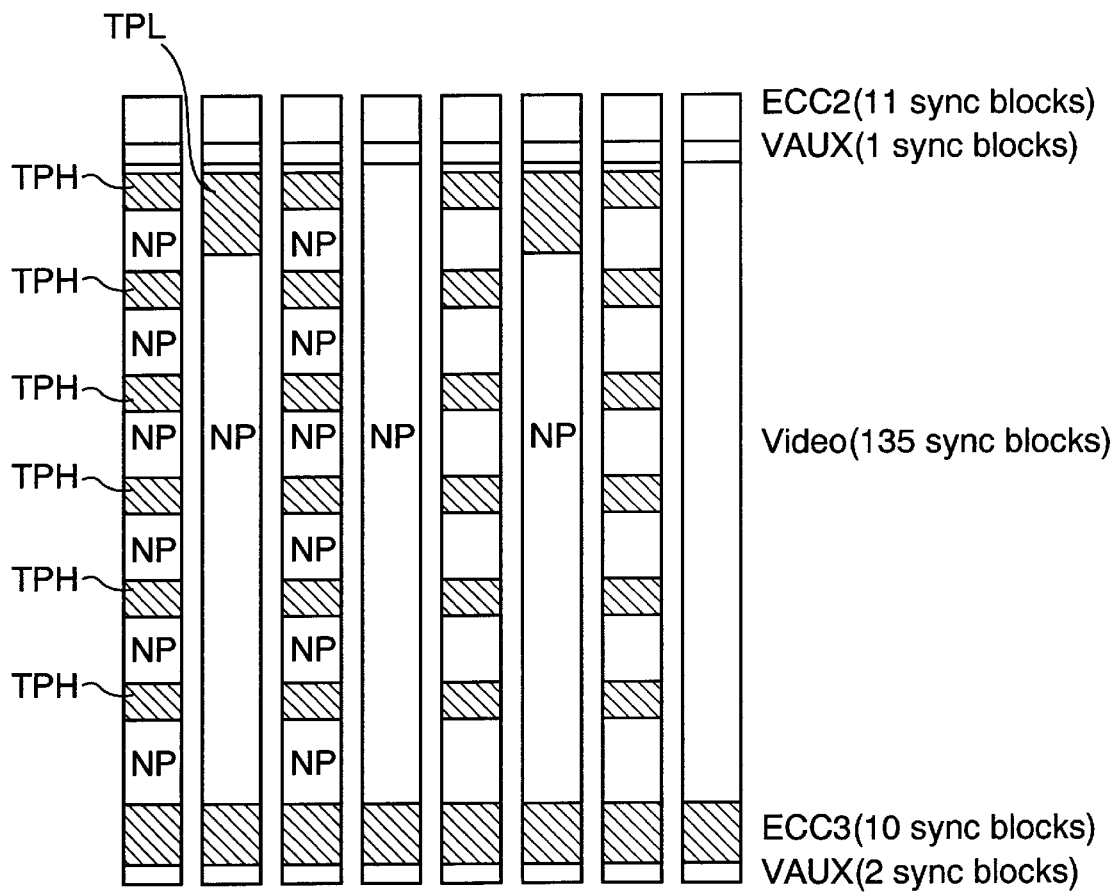
FIG. 8 depicts a schematic diagram showing a recording format of MPEG data for Video data area.

FIG. 1 shows the structure of MPEG data reproducing apparatus.

The signal recorded on the magnetic tape 1 is read out by a reproducing head 3, amplified by a reproducing amplifier 4, signal-processed, such as, demodulated, sync-signal-detected, data-separated and so on, by a reproduction signal process circuit 5 then provided to an error correction circuit 6.

The error correction circuit 6 temporally stores the provided reproduction signal into a buffer memory 7. Then, the error correction is achieved after completion of collecting such amount of data for adding error correction code on recording. Therefore, errors through the reproduction may be corrected almost perfectly.

At the normal play mode, an error-corrected signal from the error correction circuit 6 is provided into MPEG decoder (not shown) through a normal play buffer 8 and a select switch 9.

At the slow motion play mode, as described above, all signal on one recording track is reproduced through several scans of the magnetic head. In the case of DVCR on Digital VCR Association, the error correction code is added to each signal of one track. Accordingly, the error correction circuit 6 stores reproduction data, which amount corresponds to one track, into the buffer memory; then error correction is achieved for stored reproduced data corresponding to one track on the magnetic tape.

Before describing an operation of the slow motion play mode, picture to display at the slow motion play mode and a video signal to provide from the reproducing apparatus are explained with reference to FIG. 2.

FIG. 2(a) shows general picture data of MPEG. This MPEG picture data is in sequence for display and comprises I0, B0, B1, P0, B2, B3, P1, B4 . . . in this turn.

I0 picture is an intra-frame coded picture and one complete frame can be re-constructed only from the picture. P0 picture and P1 picture are inter-frame predictive-coded pictures respectively predicted from I0 picture and P0 picture. B0 and B1 pictures are inter frame predictive-coded picture predicted from I0 and P0 picture. B2 and B3 pictures are also inter-frame predictive-coded pictures predicted from P0 picture and P1 picture.

In the slow motion play mode at one-third of normal play tape speed, as shown in FIG. 2(b), there are only some frames with the interval of 3 frames, such as, I0, B0, B1, P0, in sequence for display. It is necessary for displaying complete pictures that each frame is repeatedly provided three times as shown in FIG. 2(c). However, it is necessary for usual MPEG decoder implemented, such as, in a digital broadcasting receiver, to have special function for enabling to repeatedly display each picture as shown in FIG. 2(c) on receiving non-standard MPEG data as shown in FIG. 2(b).

It is, however, possible for usual MPEG decoder without such special function to display good slow motion picture if the MPEG reproducing apparatus make and provide standard-like MPEG signal for displaying the frame sequence as shown in FIG. 2(c).

The standard-like MPEG data for displaying the frame sequence of FIG. 2(c) for usual MPEG decoder is shown in FIG. 2(d). In FIG. 2(d), each picture is shown in the display sequence same as FIGS. 2(a), 2(b) and 2(c).

First, video data of reproduced I0 picture is output without any modification. Next, forward predictive B picture Ba with zero differential data is provided twice, namely two frames of B picture Ba is output. Since the Ba picture is forward-predictive B picture, Ba picture is the inter-frame predictive-coded picture predicted from I or P picture previously displayed. In this case, the Ba picture is the inter frame predictive-coded picture predicted from I0 picture and the usual MPEG decoder without special function can provide a picture forward-predicted with zero difference from I0 picture, namely the same picture as I0 frame, when the Ba picture is input.

It may be possible for repeatedly displaying I0 picture for three times that I0 picture itself is repeatedly provided three times as shown in FIG. 2(c). However, since the amount of data of I picture is more than that of other pictures, data may overflow at the buffer of decoder side if I0 picture is provided repeatedly. Accordingly, the Ba picture which is the forward-predicted B picture with zero difference is provided.

Next, for displaying B0 picture of original picture for three times, B0 picture is first provided without any modification firstly. B0 picture is the inter-frame predictive-coded picture which is predicted from I0 picture displayed previously in time and P0 picture displayed subsequently in time. Since I0 picture and P0 picture is output as shown in FIG. 2(b), the B0 picture is provided without any modification. Following this, B0 picture is provided twice for displaying B0 picture twice.

For displaying next B1 picture for three times, the B1 picture is provided three times. This is the same as B0 picture as described above.

After these steps, it is necessary to display P0 picture for three times. However, this does not mean repeatedly providing P0 picture for three times. The reason of this is as follows. P0 picture is in general the inter-frame predictive-coded picture predicted from I picture or P picture displayed previously in time and, in this case, the inter frame predictive-coded picture predicted from I0 picture. Suppose the difference between P0 picture and I0 picture is dP0, P0 picture may be expressed as P0=I0+dP0. If P0 picture is repeatedly provided for three times, MPEG decoder which received second P0 data can interpret it as differential data from the first P0 picture previously displayed and display a picture which is expressed as {((I+dP0)+dP0)}, not P0 picture (=I0+dP0).

Therefore, the same as I0 picture, P0 picture is provided without any modification at first, then, for displaying a picture having zero difference from P0 picture, namely the same picture as P0 picture, for two times, B picture data Bb, which is the forward-predictive B picture with zero difference and has same data as Ba, is provided two times.

As described above, in the case of one-third slow motion play of original picture as shown in FIG. 2(a), the picture data as shown in FIG. 2(d) in display sequence is provided so that the picture data for displaying pictures as shown in FIG. 2(c) by usual MPEG decoder and having same frame frequency for display is output.

The frame sequence as shown in FIG. 2(d) is converted into FIG. 2(e) as shown in output sequence. This result follows because that the decode operation of B0 picture and B1 picture can not be achieved until the data of I and P picture, occurs, which are displayed after the B0 and B1 picture, is completed. Accordingly, it is necessary for decoding B picture B0 and B1 to provide I picture and P picture previously.

The production method of the picture data as shown in FIG. 2(d) is described with reference to FIG. 1 again. The reproduction data reproduced at the slow motion mode is provided from the error correction circuit 6 after collecting one complete track data. On the slow motion mode, an output data form the error correction circuit 6 is temporally stored into play buffer 11 and also provided to a frame frequency detection circuit 10. The frame frequency detection circuit 10 detects a display frame frequency from video format information of MPEG data then provide its result into a slow motion play controller 14.

The slow motion play controller 14 select a slow motion buffer 11 side of the select switch 13 and controls read out from the slow motion buffer 11, particularly read out of the amount of data corresponding to one picture from the slow motion play buffer 11.

In the case of one picture data being read out, a picture type detection circuit 15 detects the type of picture data, namely, I, P or B picture, of provided picture data from the slow motion play buffer 11 and its result is also provided to the slow motion play controller 14. The slow motion play controller 14 controls the select switch 13 in accordance with the detection result from the picture type detection circuit 15.

Accordingly, if the provided data corresponding to one picture is I picture or P picture, the slow motion play controller 14 controls the select switch 13 to select an output of a B picture production circuit 12, hence providing forward-predicted B picture with zero differential data. In the case of the provided data being B picture, the slow motion play controller 14 controls the select switch 13 such that it remains in position for selecting the slow motion buffer 11 side to then provide B picture again.

The output numbers of these dummy pictures are defined in accordance with a predetermined slow motion speed by the slow motion controller 14. If the slow motion speed is one-third as in the preferred embodiment, the slow motion play controller 14 controls a motor 2 to rotate one-third speed of normal play mode and insert 2 frame data to each one frame data of original data as described above.

As described above, a video data sequence as shown in FIG. 2(e) is provided from the select switch 13. Each data provided from the select switch 13 is further output into a time-stamp/GOP-number/display-sequence change circuit 16 and via a select switch 9 then provided to the MPEG decoder.

The time-stamp/GOP-number/display-sequence change circuit 16 changes time-stamp (a relative time information for decoding and displaying data) three times extended in one-third slow motion play mode. Further, a picture number in GOP (Group of Pictures) is also changed as three times as original. A display sequence of each picture in GOP is changed to a modified sequence which includes inserted dummy data.

In accordance with this invention, the usual MPEG decoder without special function can reproduce slow motion pictures without any contradiction.

What is claimed is:

1. An apparatus for reproducing MPEG data comprising:
   a normal providing means for providing picture data included in an original MPEG data on a normal play mode; and
   a slow providing means for providing the picture data included in the original MPEG data and dummy data for repeatedly displaying the original MPEG data several times in accordance with a slow motion speed on a slow motion mode,
   wherein the dummy picture data for repeating an original I picture or an original P picture occurring in the original MPEG data is a forward-predictive B picture with zero differential data, and the dummy data for repeating an original B picture occurring in the original MPEG is the original B picture itself.

2. The apparatus recited in claim 1 for reproducing MPEG data wherein a sum of display numbers of original picture data provided in a second and display numbers of the dummy picture data provided in a second is equal to display numbers of original MPEG data in a second in the normal play mode.

3. An apparatus for providing MPEG data comprising:
   slow motion providing means for providing input picture data having input MPEG data and dummy picture data for repeatedly displaying the input picture data several times in accordance with a slow motion ratio and
   means for providing the dummy picture data for repeating an original I picture or an original P picture occurring in the input MPEG data by using a forward-predictive B picture with zero differential data, and the dummy data for repeating an original B picture occurring in the input MPEG data by using the original B picture itself.

4. The apparatus recited in claim 3 for providing MPEG data wherein a sum of display numbers of original picture data provided in a second and display numbers of the dummy picture data provided in a second is equal to display numbers of original MPEG data in a second in the normal play mode.

5. An apparatus for providing MPEG data comprising:
   slow motion providing means for providing input picture data having input MPEG data and dummy picture data for repeatedly displaying the input picture data several times in accordance with a slow motion ratio, wherein the slow motion providing means comprises:

a slow motion controller;

a slow buffer for temporarily storing the input MPEG data;

a frame frequency detecting means for detecting frame numbers to display;

a B picture production means for producing a B picture with zero differential data from the input MPEG data; and a picture type detection means for detecting a picture type of picture data read out from the slow buffer;

wherein the slow motion controller, in response to the picture type detected by the picture type detection means and the frame frequency detecting means, selects an output from either the slow buffer or the B picture production means as said dummy picture data.

6. A method for providing MPEG data comprising the steps of:

providing input picture data included in original input MPEG data and dummy picture data for repeatedly displaying the input picture data several times in accordance with a slow motion ratio; and providing a forward-predictive B picture with zero differential data as the dummy picture data for repeating an I picture or a P picture occurring in the original MPEG data, and providing a B picture itself as the dummy picture data for repeating the B picture occurring in the original MPEG data.

7. The method recited in claim 6 for providing MPEG data wherein a sum of display numbers of original picture data provided in a second and display numbers of the dummy picture data provided in a second is equal to display numbers of original MPEG data in a second in the normal play mode.

* * * * *